(12) United States Patent
Nakamura et al.

(10) Patent No.: US 11,016,377 B2
(45) Date of Patent: May 25, 2021

(54) IMAGE DISPLAY APPARATUS AND CONTROL METHOD THEREOF

(71) Applicant: SEIKO EPSON CORPORATION, Tokyo (JP)

(72) Inventors: Yasuhiro Nakamura, Matsumoto (JP); Yasuhiro Honda, Shiojiri (JP); Kazutoshi Okada, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/263,122

(22) Filed: Jan. 31, 2019

(65) Prior Publication Data

US 2019/0235373 A1 Aug. 1, 2019

(30) Foreign Application Priority Data

Feb. 1, 2018 (JP) .............................. JP2018-016186

(51) Int. Cl.
| | | |
|---|---|---|
| *G03B 21/00* | (2006.01) | |
| *G09G 3/36* | (2006.01) | |
| *G02F 1/13357* | (2006.01) | |
| *G03B 21/20* | (2006.01) | |
| *G02F 1/1335* | (2006.01) | |

(52) U.S. Cl.
CPC ....... *G03B 21/2053* (2013.01); *G02F 1/1336* (2013.01); *G09G 3/36* (2013.01); *G02F 1/133627* (2021.01); *G09G 2300/0478* (2013.01); *G09G 2320/046* (2013.01); *G09G 2330/021* (2013.01); *G09G 2330/027* (2013.01); *G09G 2354/00* (2013.01)

(58) Field of Classification Search
CPC ........ G09G 2320/046; G09G 2320/043; G06F 3/1415
See application file for complete search history.

(56) References Cited

U.S. PATENT DOCUMENTS

| | | | |
|---|---|---|---|
| 6,457,134 B1 | 9/2002 | Lemke et al. | |
| 7,245,316 B2 * | 7/2007 | Grimes | .................... H04N 3/20 |
| | | | 348/173 |

(Continued)

FOREIGN PATENT DOCUMENTS

| | | |
|---|---|---|
| EP | 2 309 825 A1 | 4/2011 |
| JP | 2007-206679 A | 8/2007 |
| JP | 2014-202855 A | 10/2014 |

OTHER PUBLICATIONS

Mar. 8, 2019 partial Search Report issued in European Patent Application No. 19154448.5.

(Continued)

*Primary Examiner* — Brian P Yenke
(74) *Attorney, Agent, or Firm* — Oliff PLC

(57) ABSTRACT

A projector includes an image projection unit for displaying an image by a liquid crystal panel, and a controller that powers off the projector after displaying a black image in the image projection unit for a predetermined time (a set refresh time) in a refresh mode for improving burn-in of the liquid crystal panel, in which the controller stops the refresh mode when an interrupt event is generated before the set refresh time elapses in the refresh mode and powers off the projector after executing an interrupt process according to the interrupt event.

6 Claims, 8 Drawing Sheets

(56) References Cited

U.S. PATENT DOCUMENTS

| | | | |
|---|---|---|---|
| 7,750,936 B2* | 7/2010 | Provinsal | H04N 7/181 345/647 |
| 9,071,773 B2* | 6/2015 | Oka | H04N 9/3179 |
| 9,106,984 B2* | 8/2015 | Mukai | H04Q 11/0067 |
| 9,411,162 B2* | 8/2016 | Tanaka | G09G 3/003 |
| 9,524,676 B2* | 12/2016 | Bi | G09G 3/3275 |
| 9,613,591 B2* | 4/2017 | Ryu | G06F 3/1454 |
| 9,715,843 B2* | 7/2017 | Li | G09G 3/006 |
| 9,965,015 B2* | 5/2018 | Im | G06F 1/3265 |
| 9,997,104 B2* | 6/2018 | Zhang | G09G 3/3208 |
| 10,147,401 B2* | 12/2018 | Lee | G06T 3/20 |
| 10,289,428 B2* | 5/2019 | Im | G06F 9/4418 |
| 2002/0108020 A1* | 8/2002 | Take | G06F 12/0866 711/119 |
| 2004/0135768 A1 | 7/2004 | Gu | |
| 2004/0170398 A1* | 9/2004 | Nishigaki | H04N 5/44 386/234 |
| 2005/0052446 A1* | 3/2005 | Plut | G06F 1/3218 345/211 |
| 2005/0060669 A1* | 3/2005 | Lowles | G09G 5/02 715/867 |
| 2005/0235229 A1* | 10/2005 | Ikemoto | G06F 1/3203 715/867 |
| 2006/0090088 A1* | 4/2006 | Choi | G06F 1/3215 713/300 |
| 2007/0016867 A1* | 1/2007 | Nickell | G06F 9/451 715/730 |
| 2007/0028174 A1* | 2/2007 | Moore | G06F 9/5072 715/733 |
| 2007/0159427 A1 | 7/2007 | Koide et al. | |
| 2009/0082066 A1* | 3/2009 | Katz | H04W 52/027 455/566 |
| 2009/0138507 A1* | 5/2009 | Burckart | G11B 27/105 |
| 2010/0060789 A1* | 3/2010 | Aoki | G09G 5/14 348/563 |
| 2011/0154270 A1* | 6/2011 | Sonoda | H04N 5/781 715/867 |
| 2011/0267026 A1* | 11/2011 | Locker | G06F 1/3231 323/318 |
| 2011/0292080 A1* | 12/2011 | Oka | H04N 9/3179 345/634 |
| 2012/0060130 A1 | 3/2012 | Lin | |
| 2013/0342309 A1* | 12/2013 | Jiang | G06F 11/3438 340/3.1 |
| 2015/0161936 A1* | 6/2015 | Jang | G09G 3/20 345/214 |
| 2015/0294098 A1* | 10/2015 | Suwa | G06F 21/32 726/19 |
| 2015/0310790 A1* | 10/2015 | Hatakeyama | G09G 3/30 345/156 |
| 2016/0127765 A1* | 5/2016 | Robinson | H04N 21/4333 725/12 |
| 2016/0260413 A1* | 9/2016 | You | G09G 5/003 |
| 2016/0379550 A1* | 12/2016 | Jiang | G09G 3/3208 345/520 |
| 2017/0004753 A1* | 1/2017 | Kim | G09G 3/3233 |
| 2017/0230625 A1* | 8/2017 | Chalapalli | H04N 9/12 |
| 2017/0287391 A1* | 10/2017 | Zhuang | G06F 13/14 |
| 2018/0005598 A1* | 1/2018 | Kambhatla | G09G 3/3208 |
| 2018/0059911 A1* | 3/2018 | Kim | G06F 3/0481 |
| 2018/0098039 A1* | 4/2018 | Yagi | H04N 9/3164 |
| 2018/0115675 A1* | 4/2018 | Ikeda | H04N 1/00915 |
| 2018/0190174 A1* | 7/2018 | Kambhatla | G09G 3/3208 |
| 2018/0261151 A1* | 9/2018 | Chung | G09G 3/3208 |
| 2018/0350290 A1* | 12/2018 | Drzaic | G09G 3/32 |
| 2019/0027080 A1* | 1/2019 | Johnson | G09G 3/2003 |
| 2019/0043423 A1* | 2/2019 | Azam | G06F 3/04847 |
| 2019/0080670 A1* | 3/2019 | Jung | G09G 5/10 |

OTHER PUBLICATIONS

"Log file—Wikipedia," https://en.wikipedia.org/w/index.php?title=Log_file&oldid=821879861, retrieved Feb. 27, 2019.

May 28, 2019 Extended Search Report issued in European Patent Application No. 19154448.5.

"3M Touch Systems Technical Note Product: LCD Monitors-Image Sticking, LCD Monitors-Image Sticking,What Causes Image Sticking? How Do I Avoid Image Sticking in My Display?", 3M Touch Systems Inc. Proprietary Information, Dec. 31, 2016, Retrieved from the Internet: url:https://multimedia.3m.com/mws/media/4199100/technote-Icd-monitors-image-sticking-november-20016.pdf., Retrieved on May 20, 2019, pp. 1-3.

* cited by examiner

IMAGE DISPLAY APPARATUS AND CONTROL METHOD THEREOF

CROSS-REFERENCE

The entire disclosure of Japanese Patent Application No. 2018-016186, filed Feb. 1, 2018 is expressly incorporated by reference herein.

BACKGROUND

1. Technical Field

The present invention relates to an image display apparatus for displaying an image and a control method thereof.

2. Related Art

An image display apparatus using a liquid crystal panel or the like has a phenomenon in which an afterimage of a still image is burnt into the liquid crystal panel when the same still image is continuously displayed for a long time (hereinafter also referred to as "burn-in"). In the related art, in an image display apparatus in which such burn-in occurs, an image (hereinafter also referred to as "refresh image") for improving the burn-in, such as an all-black image or an all-white image, is continuously displayed (see, for example, JP-A-2014-202855). Here, in order to improve the burn-in, it is necessary to continuously display the refresh image for a longtime (for example, for one hour or longer), and therefore, it is preferable to have a function of automatically powering off the image display apparatus after displaying the refresh image for a predetermined time so that the user does not need to wait for the display to end.

However, when an unintentional interrupt is generated in a computer of the image display apparatus while the refresh image is being displayed, since the display of the refresh image is interrupted and process is performed according to the interrupt, there is a case where the power is maintained on even after the end of the process. For this reason, when the user is not in the vicinity of the image display apparatus, there is a problem that the image display apparatus is left with the power turned on for many hours or days.

SUMMARY

An advantage of some aspects of the invention is to solve at least a part of the problems described above, and the invention can be implemented as the following aspects or application examples.

Application Example 1

An image display apparatus according to this application example includes a display unit that has an electro-optical device and displays an image with the electro-optical device, and a controller that powers off the image display apparatus after displaying a first image on the display unit for a first time in a first operation mode for improving a burn-in of the electro-optical device, in which the controller stops the first operation mode in a case where a first interrupt is generated before the first time elapses in the first operation mode and powers off the image display apparatus after executing an interrupt process according to the first interrupt.

According to the image display apparatus, when the first interrupt is generated before the first time elapses in the first operation mode for improving the burn-in of the electro-optical device, the controller stops the first operation mode and powers off the image display apparatus after executing the interrupt process. For this reason, it is possible to prevent a situation that the image display apparatus is left with the power turned on after the interrupt process.

Application Example 2

In the image display apparatus according to the application example, it is preferable that the controller stops the first operation mode in a case where a second interrupt different from the first interrupt is generated in the first operation mode, but preferably does not power off the image display apparatus after executing the interrupt process according to the second interrupt.

According to the image display apparatus, the controller powers off the image display apparatus when the first interrupt is generated, but does not power off the image display apparatus in a case where the second interrupt is generated. That is, the power state after the interrupt process can be changed depending on the type of interrupt process, thereby improving the convenience of the user.

Application Example 3

It is preferable that the image display apparatus according to the application example further includes an input operation unit that receives an operation of a user, in which the second interrupt is an interrupt based on the operation on the input operation unit.

According to the image display apparatus, since the controller does not power off the image display apparatus in a case where the interrupt is generated based on the operation on the input operation unit, a user can operate the input operation unit to stop the first operation mode and use the image display apparatus even during the first operation mode.

Application Example 4

It is preferable that the image display apparatus according to the application example further includes a storage unit and an informing unit, in which in a case where the first operation mode is stopped, the controller causes the storage unit to store information indicating that the first operation mode is stopped, and in a case where the information indicating that the first operation mode is stopped is stored in the storage unit when the image display apparatus is powered on, the controller causes the informing unit to inform that the first operation mode is stopped.

According to the image display apparatus, in a case where the first operation mode is stopped according to the first interrupt, since the controller causes the storage unit to store the information indicating that the first operation mode is stopped, and causes the informing unit to inform that the first operation mode is stopped at the next start-up, the user can recognize that the first operation mode is stopped and that the first operation mode has to be executed again if necessary.

Application Example 5

In the image display apparatus according to the application example, it is preferable that the display unit modulates a light emitted from a light source with the electro-optical device to display the image, and the controller causes the display unit to display the first image while maintaining the light source in a light-on state in the first operation mode.

According to the image display apparatus, the controller displays the first image on the display unit while the light source is kept in the light-on state, so that the electro-optical device can be maintained at a relatively high temperature, and the burn-in can be effectively improved.

Application Example 6

A control method of an image display apparatus according to this application example is a control method of an image display apparatus for displaying an image with an electro-optical device, the method, including powering off the image display apparatus after displaying a first image for a first time in a first operation mode for improving a burn-in of the electro-optical device, and stopping the first operation mode in a case where a first interrupt is generated before the first time elapses in the first operation mode and powering off the image display apparatus after executing an interrupt process according to the first interrupt.

According to the control method of the image display apparatus, the first operation mode is stopped and the image display apparatus is powered off after executing the interrupt process in a case where the first interrupt is generated before the first time elapses in the first operation mode for improving the burn-in of the electro-optical device. For this reason, it is possible to prevent a situation that the image display apparatus is left with the power turned on after the interrupt process.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an image projection system of the present embodiment will be described with reference to the drawings.

Figure 1:
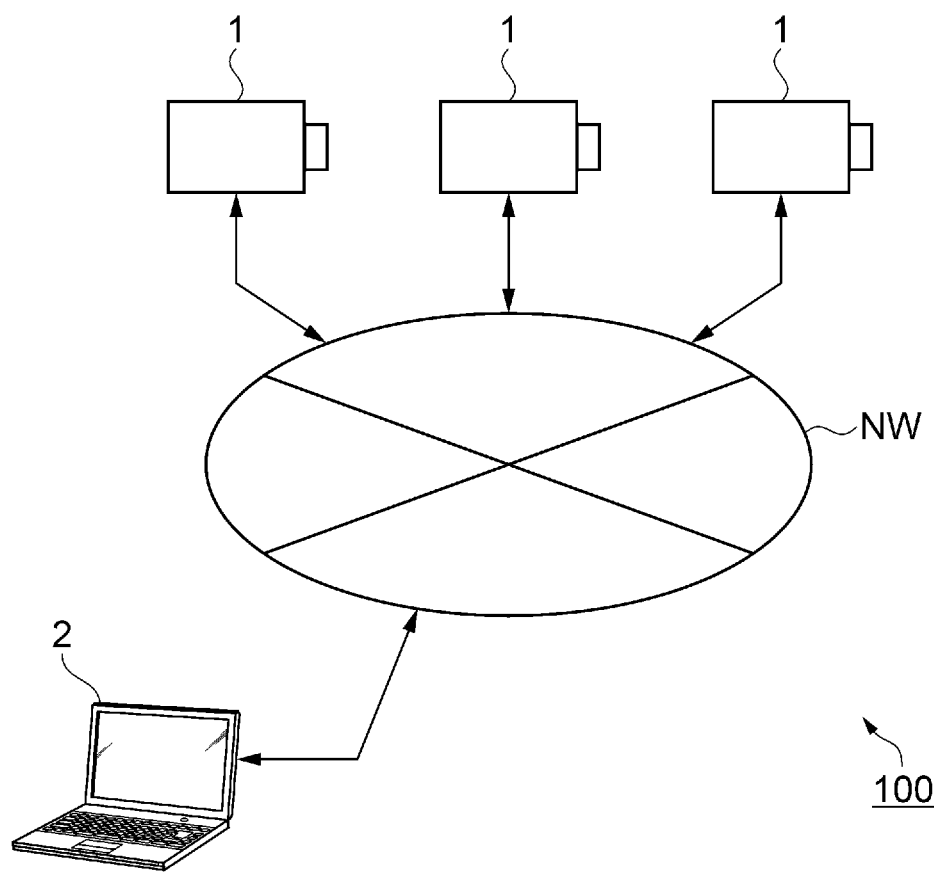
FIG. 1 is a diagram for explaining an image projection system.

FIG. 1 is a diagram for explaining an image projection system 100 according to the embodiment.

As shown in FIG. 1, an image projection system 100 as an image display system includes a plurality of projectors 1 as image display apparatuses and a computer 2 as a controller. A plurality of projectors 1 and the computer 2 are connected to each other through a network NW, and the computer 2 can control the operation of each projector 1.

Although not shown in FIG. 1, for displaying a desired content image on the projector 1, an external image supply apparatus 3 (see FIG. 2) is connected to the projector 1 and image information corresponding to the content image is supplied from the image supply apparatus 3 to the projector 1.

Figure 2:
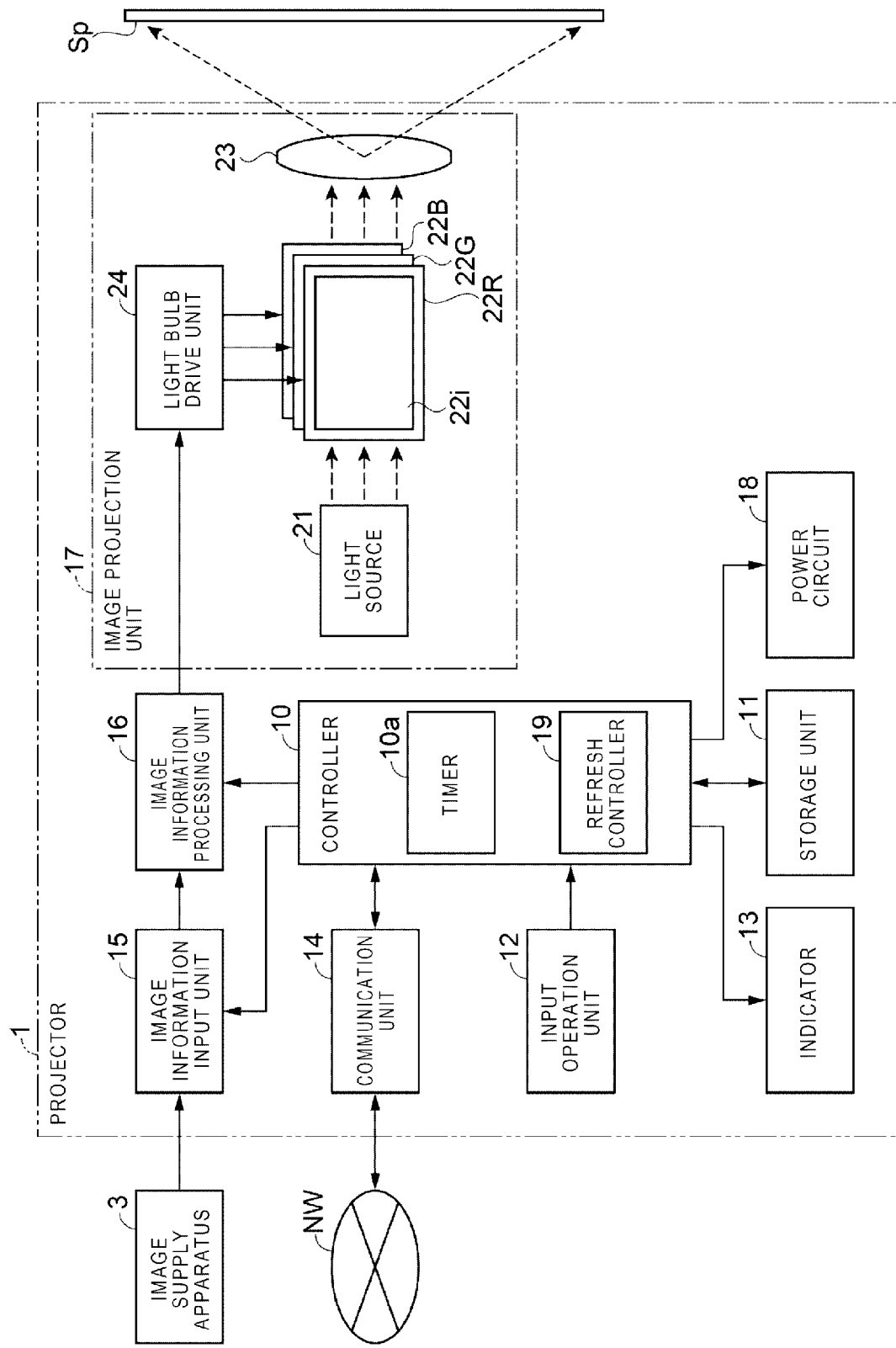
FIG. 2 is a block diagram showing a schematic configuration of a projector.

FIG. 2 is a block diagram showing a schematic configuration of the projector 1.

As shown in FIG. 2, the projector 1 integrally includes a controller 10, a storage unit 11, an input operation unit 12, an indicator 13, a communication unit 14, an image information input unit 15, an image information processing unit 16, an image projection unit 17 as a display unit, and a power circuit 18. The projector 1 projects an image from the image projection unit 17 to a projection surface Sp based on the image information input to the image information input unit 15.

The controller 10 includes one or a plurality of processors, and controls the overall operation of the projector 1 by operating in accordance with the control program stored in the storage unit 11. In addition, the controller 10 has a timer 10a for measuring time.

The storage unit 11 includes a memory such as Random Access Memory (RAM) and Read Only Memory (ROM). The RAM is used for temporary storage of various data and the like, and the ROM stores a control program, control data, and the like for controlling the operation of the projector 1.

The input operation unit 12 includes a plurality of operation keys for the user to issue various instructions to the projector 1, and receives a user's input operation on the operation keys. The input operation unit 12 includes the operation keys such as a "power key" for switching between power on and off (standby), a "menu key" for displaying a menu image for performing various settings, a "direction key" for selecting an item on the menu image, a "determination key" for confirming a selected item, and the like, for example. When the user operates various operation keys of the input operation unit 12, the input operation unit 12 outputs an operation signal corresponding to the operation of the user to the controller 10. A remote controller (not shown) capable of remote controlling may be used as the input operation unit 12. In this case, the remote controller transmits an infrared operation signal according to the operation of the user, and a remote control signal reception unit (not shown) receives the infrared operation signal and transmits the received signal to the controller 10.

The indicator 13 includes one or a plurality of Light Emitting Diodes (LEDs). The indicator 13 emits light based on the control of the controller 10, and informs the user of the operating state of the projector 1, the occurrence of an abnormality, and the like with the light color and the light emitting state (light-off, light-on and flickering).

The communication unit 14 is connected to an external device such as the computer 2 and other projectors 1 through a network NW and transmits and receives information to and from these devices based on the control of the controller 10. The connection between the communication unit 14 and the external device is not limited to a wired connection, and may be a wireless connection.

The image information input unit 15 is connected to the external image supply apparatus 3 such as an image reproducing device and receives a supply of image information corresponding to the content image from the image supply apparatus 3. In addition, the image information input unit 15 can receive, from the controller 10, a supply of image information stored in the storage unit 11 and image information generated by the controller 10. The image information input unit 15 outputs the input image information to the image information processing unit 16. When no significant image information is supplied from the image supply apparatus 3, the image information input unit 15 outputs the image information of the all-blue image to the image information processing unit 16.

The image information processing unit 16 performs various image processing on the image information input from the image information input unit 15 based on the control of the controller 10 and outputs the processed image information to a light bulb drive unit 24 of the image projection unit 17. For example, the image information processing unit 16 performs process for adjusting image quality, process for correcting shape (distortion) of the image, process for superimposing and displaying an On Screen Display (OSD) image such as a menu image or a message image on the content image, and the like to the image information as necessary.

The image information input unit 15 and the image information processing unit 16 may be configured as one or a plurality of processors or the like, or may be configured as a dedicated processing device such as Application Specific Integrated Circuit (ASIC), Field Programmable Gate Array (FPGA), or the like.

The image projection unit 17 includes a light source 21, three liquid crystal light bulbs 22R, 22G, and 22B as an electro-optical device and a light modulation device, a projection optical system 23, a light bulb drive unit 24, and the like. The image projection unit 17 modulates the light emitted from the light source 21 with the liquid crystal light bulbs 22R, 22G, and 22B to form an image light, and projects the image light through the projection optical system 23 including at least one of a lens and a mirror to display the image on the projection surface Sp.

The light source 21 includes a discharge light source lamp such as a super high-pressure mercury lamp or a metal halide lamp, or a solid light source such as a light emitting diode or a semiconductor laser. The light emitted from the light source 21 is converted into light having a substantially uniform luminance distribution by an integrator optical system (not shown), and separated into three color components of red (R), green (G), and blue (B), which are the three primary colors of light, by a color separation optical system (not shown), and then enter the liquid crystal light bulbs 22R, 22G, and 22B, respectively.

The liquid crystal light bulbs 22R, 22G, and 22B are respectively formed by a transmission type liquid crystal panel or the like, in which a liquid crystal is sealed between a pair of transparent substrates. In each liquid crystal panel, a rectangular pixel region 22$i$ composed of a plurality of pixels arranged in a matrix shape is formed, and a drive voltage can be applied to each pixel for the liquid crystal.

The light bulb drive unit 24 forms an image in the pixel region 22$i$ of the liquid crystal light bulbs 22R, 22G, 22B. Specifically, the light bulb drive unit 24 applies a drive voltage corresponding to the image information input from the image information processing unit 16 to each pixel of the pixel region 22$i$, and sets each pixel to a light transmittance corresponding to the image information. The light emitted from the light source 21 is transmitted through the pixel region 22$i$ of the liquid crystal light bulbs 22R, 22G, 22B to be modulated for each pixel and an image light corresponding to the image information is formed for each color light. The image light of each color formed as described above is synthesized for each pixel by a color synthesizing optical system (not shown) into an image light representing a color image, and is expanded and projected on the projection surface Sp by the projection optical system 23. As a result, an image based on the image information input to the image information input unit 15 is displayed on the projection surface Sp.

A commercial power (not shown) such as AC 100 V is supplied to the power circuit 18 from the outside. The power circuit 18 converts the commercial power (AC power) into DC power of a predetermined voltage, and supplies electric power to each part of the projector 1 (supply route to each part is not shown). The controller 10 can control the power circuit 18 to start or stop supplying power to each part. Specifically, the controller 10 can switch between an on state (also referred to as "power on state") in which power required for normal operation of the projector 1 is supplied from the power circuit 18 to each part and an off state (also referred to as "power off state" or "standby state") in which the power supply to each part is restricted and the power consumption is significantly lower as compared with the on state. The operation in which the controller 10 controls the power circuit 18 to switch from the off state to the on state is also referred to as an "on operation", and the operation of the controller 10 switching from the on state to the off state is also referred to as an "off operation".

The controller 10 includes a refresh controller 19 as a functional block realized by the control program. The refresh controller 19 controls to improve the burn-in occurred in the liquid crystal panels of the liquid crystal light bulbs 22R, 22G, and 22B. Specifically, when burn-in occurs in the liquid crystal panel, the user can operate the input operation unit 12 to shift the projector 1 to the refresh mode. The refresh mode is an operation mode for improving the burn-in, and the refresh controller 19 in the refresh mode displays a predetermined image (hereinafter, also referred to as "refresh image") for improving burn-in on the image projection unit 17, and continuously maintains this state for a predetermined time to improve burn-in. In the present embodiment, an all-black image (black image) is used as the refresh image. Since it is effective to keep displaying the refresh image at a relatively high-temperature environment in order to improve the burn-in, the refresh controller 19 displays the black image while maintaining the light source 21 in a light-on state in the refresh mode.

The operation mode of projecting the content image from the image projection unit 17 based on the image information supplied from the image supply apparatus 3 is referred to as the normal operation mode. In the normal operation mode, the on state is maintained until the user operates the power key of the input operation unit 12, whereas in the refresh mode, the refresh mode is automatically shifted to the off state after a predetermined time elapses from the start of projection of the refresh image. Therefore, when the refresh mode is completed, the user does not need to operate the power key to shift to the off state. That is, even when the user is not in the vicinity of the projector 1 after shifting to the refresh mode, the projector 1 is not left in the on state for a long time.

FIGS. 3 to 6 are diagrams for explaining the operation of the projector 1 when starting the refresh mode, and showing an OSD image superimposed by the image information processing unit 16.

When the user operates the menu key of the input operation unit 12, the controller 10 instructs the image information processing unit 16 to superimpose a menu image M1 (see FIG. 3) for performing various settings or causing a desired operation on the content image as an OSD image, and causes the image projection unit 17 to project the menu image M1.

Figure 3:
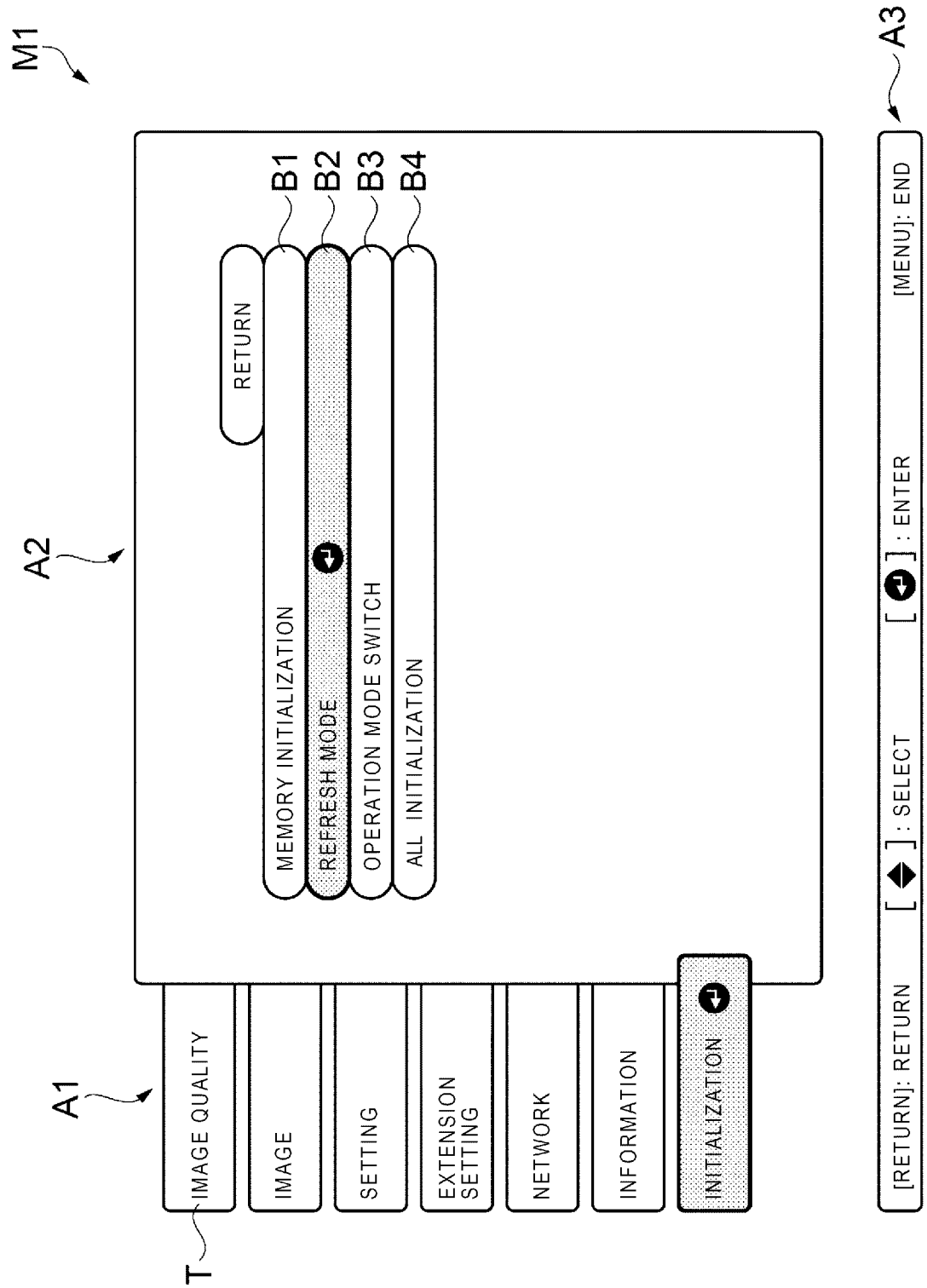
FIG. 3 is a diagram for explaining an operation of a projector when starting a refresh mode, which shows an OSD image superimposed by an image information processing unit.

As shown in FIG. 3, the menu image M1 includes a tab arrangement region A1, a setting region A2, and a guide region A3. In the tab arrangement region A1, a plurality of tabs T indicating item names to be set are aligned in a row, and settings related to a selected tab (item) are displayed in the setting region A2. In addition, texts of guidance regarding operation are displayed in the guide region A3. The user can select one of the tabs T in the tab arrangement region A1 with the direction key to set or instruct about the item of the selected tab T in the setting region A2. FIG. 3 shows a state in which a tab T indicating "INITIALIZATION" is selected, and the setting region A2 includes four buttons B1 to B4 for the settings related to "INITIALIZATION". Each of the buttons B1 to B4 indicate "MEMORY INITIALIZATION", "REFRESH MODE", "OPERATION MODE SWITCH", and "ALL INITIALIZATION" thereon, respectively.

Figure 4:
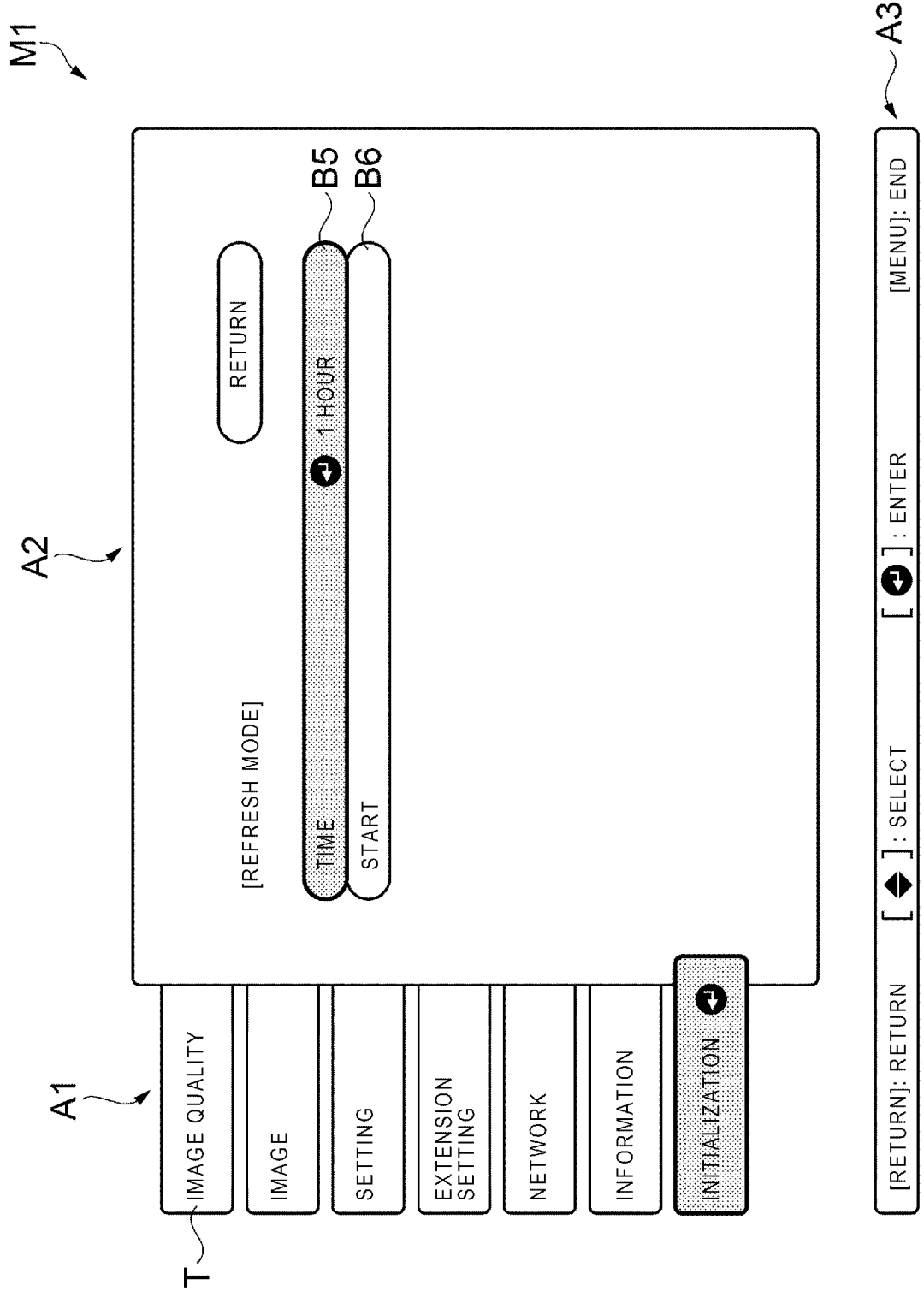
FIG. 4 is a diagram for explaining an operation of a projector when starting a refresh mode, which shows an OSD image superimposed by an image information processing unit.
Figure 5:
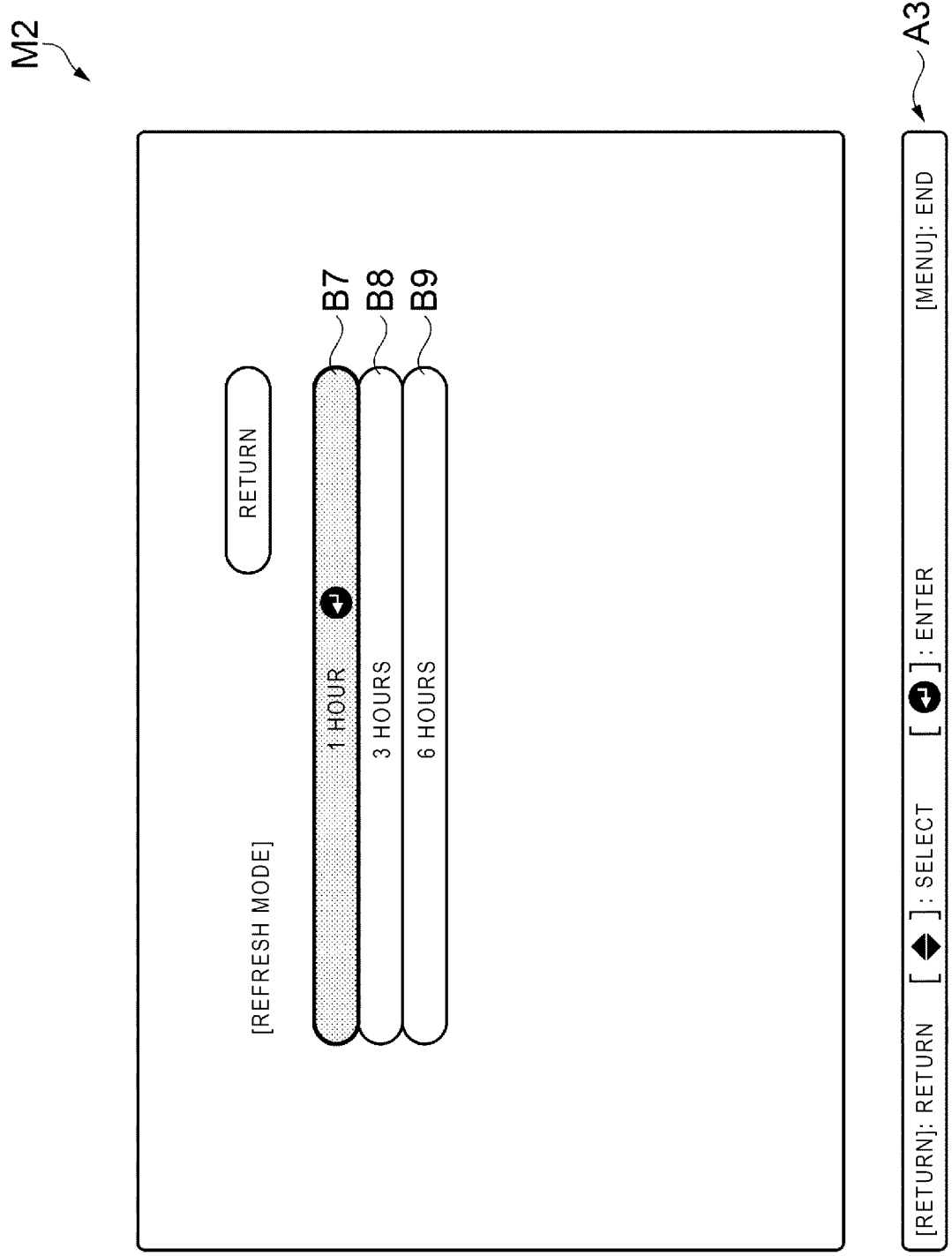
FIG. 5 is a diagram for explaining an operation of a projector when starting a refresh mode, which shows an OSD image superimposed by an image information processing unit.

Here, when the user selects the button B2 indicating "REFRESH MODE" with the direction key and operates the determination key, the controller 10 instructs the image information processing unit 16 to switch the setting region A2 of the menu image M1 to that related to the "REFRESH MODE" (see FIG. 4). As shown in FIG. 4, the setting region A2 includes a time setting button B5 indicating "TIME" and a start button B6 indicating "START. In the time setting button B5, the time (hereinafter also referred to as "refresh time") of the currently set refresh mode is displayed such that the current setting state (set refresh time) is recognizable.

The user can change the refresh time by selecting the time setting button B5 with the direction key and operating the determination key. When the user instructs to change the refresh time, the controller 10 instructs the image information processing unit 16 to superimpose and display a setting image M2 (see FIG. 5) for setting the refresh time on the menu image M1. The setting image M2 includes a button B7 indicating "1 hour", a button B8 indicating "3 hours", and a button B9 indicating "6 hours". The user can set the refresh time by selecting a button that indicates a desired time.

Figure 6:
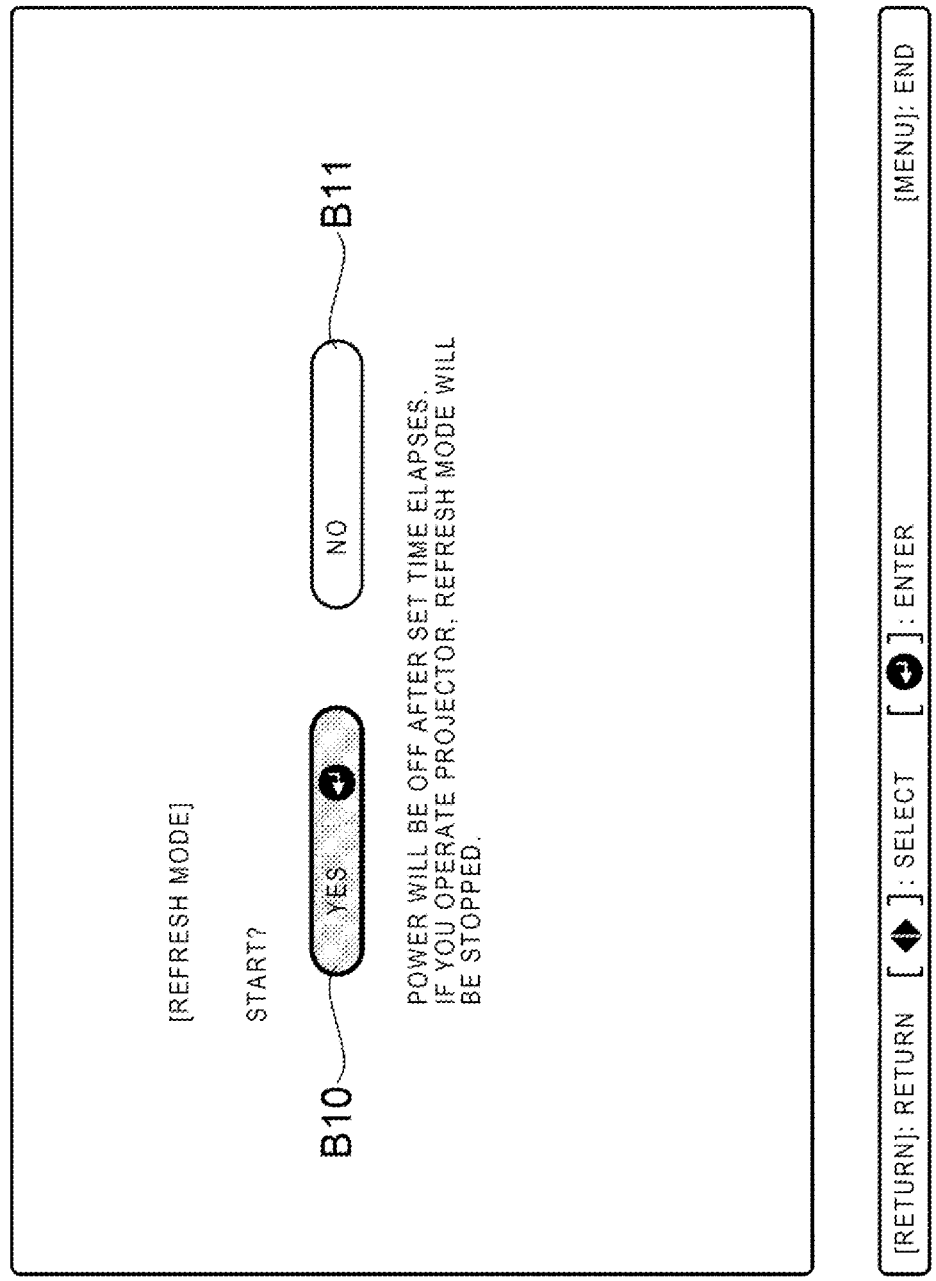
FIG. 6 is a diagram for explaining an operation of a projector when starting a refresh mode, which shows an OSD image superimposed by an image information processing unit.

Returning to FIG. 4, the user can start the refresh mode by selecting the start button B6 of the setting region A2 with the direction key and operating the determination key. When the user instructs to start the refresh mode, the controller 10 instructs the image information processing unit 16 to superimpose and display a confirm image M3 (see FIG. 6) for confirming as to the start of the refresh mode. As shown in FIG. 6, the confirm image M3 includes a message asking whether to start the refresh mode or not and a YES button B10 marked "YES" and a NO button B11 marked "NO", and the user can start the refresh mode by selecting the YES button B10 with the direction key and operating the determination key.

Figure 7:
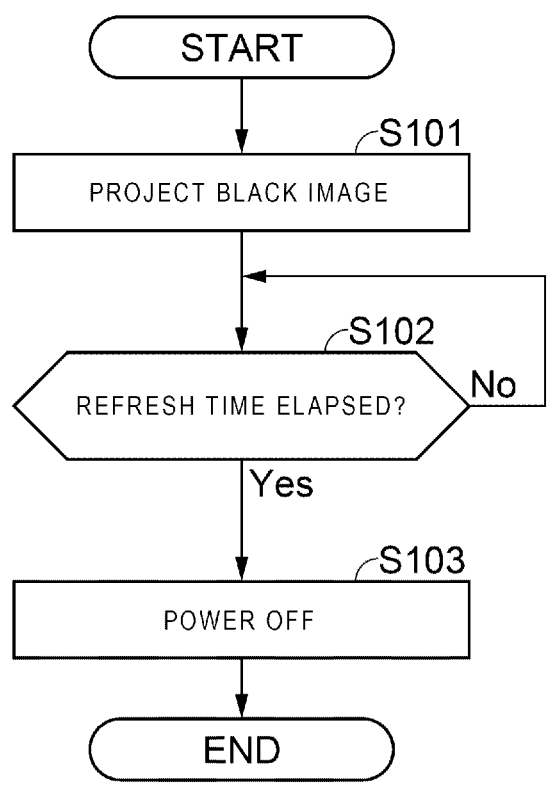
FIG. 7 is a flowchart for explaining an operation of a projector in a refresh mode.

FIG. 7 is a flowchart for explaining the operation of the projector 1 in the refresh mode.

As shown in FIG. 7, when the user confirms the start of the refresh mode, the refresh controller 19 outputs the image information representing the black image to the image information input unit 15 and causes the image projection unit 17 to project the black image, at step S101. In addition, the refresh controller 19 starts counting the refresh time by the timer 10a.

At step S102, the refresh controller 19 determines whether or not the set refresh time has elapsed since the refresh mode was started based on the counting result of the timer 10a. Then, when the refresh time has elapsed, the refresh controller 19 moves the process to step S103, and when the refresh time has not elapsed, step S102 is repeated.

When the refresh time has elapsed since the refresh mode was started, the process moves to step S103, in which the refresh controller 19 instructs the power circuit 18 to shift the power of the projector 1 to the off state (standby state), and ends the process. Thus, the refresh mode is ended. As described above, according to the projector 1 of the present embodiment, once the refresh mode is started, it is possible to continuously display the refresh image (black image) during a set refresh time.

When a predetermined interrupt event is generated while the projector 1 is operating in the refresh mode, that is, while step S102 is being reiterated before the refresh time elapses, the controller 10 executes a process (hereinafter also referred to as "interrupt process") according to the interrupt event in preference to the refresh mode. It is assumed that the interrupt event that may be generated during the operation of the refresh mode is, for example, a user operation on the input operation unit 12, an abnormality occurring inside the projector 1, or reception of an emergency message from the computer 2, and the like.

Figure 8:
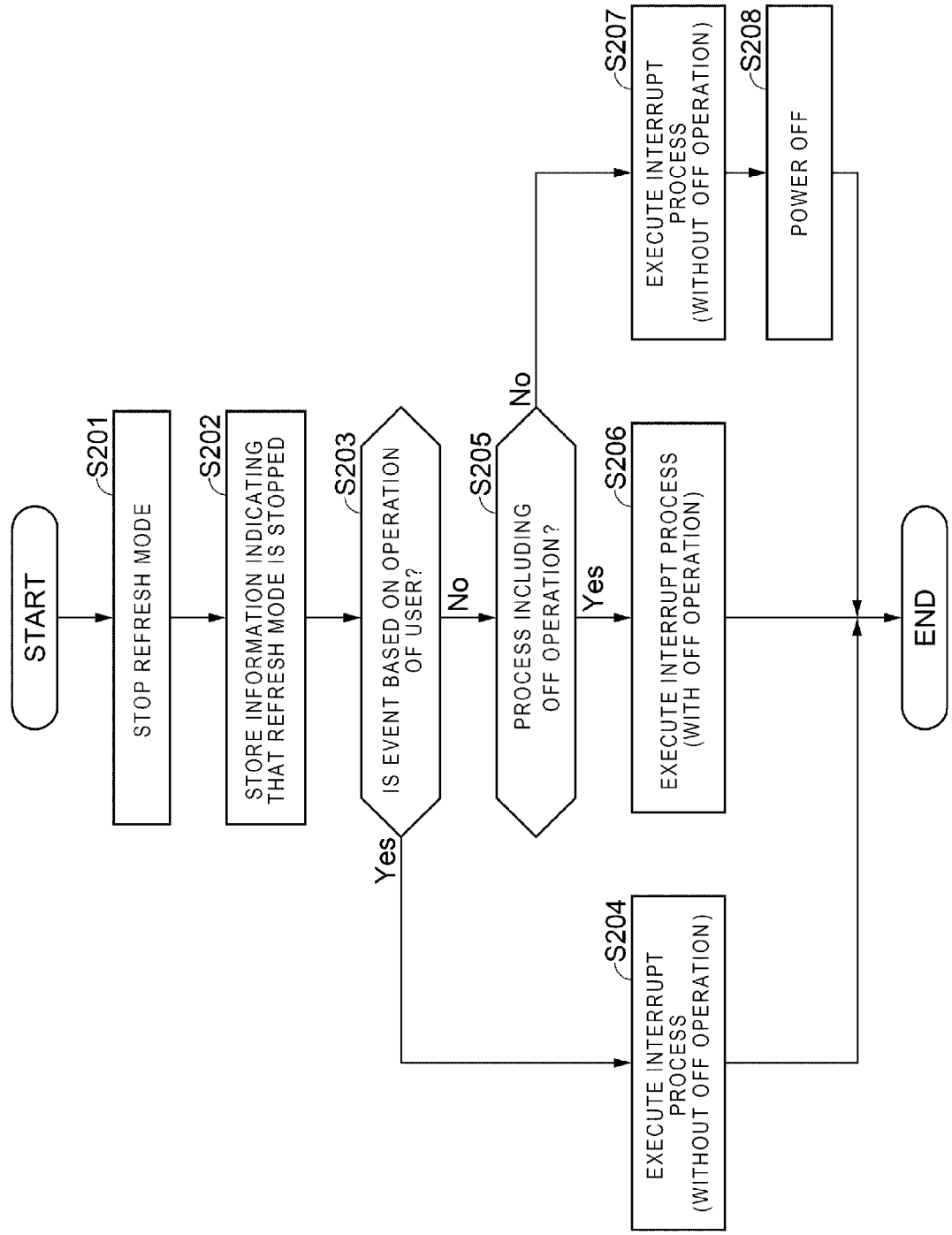
FIG. 8 is a flowchart for explaining an operation of a projector when an interrupt event is generated.

FIG. 8 is a flowchart for explaining the operation of the projector 1 when an interrupt event is generated.

As shown in FIG. 8, when an interrupt event is generated in the refresh mode, the controller 10 stops the refresh mode, at step S201. Specifically, the controller 10 instructs the image information input unit 15 to output the image information of the content image supplied from the image supply apparatus 3 to the image information processing unit 16 instead of the image information corresponding to the black image. As a result, projection of the black image from the image projection unit 17 is ended, and the content image is projected instead. As a result of stopping the refresh mode, the process of powering off (step S103) upon elapse of the refresh time is also stopped.

At step S202 that follows, the controller 10 stores in the storage unit 11 information indicating that the refresh mode is stopped and information on the generated interrupt event (for example, the date and time of generation, the type of the event, etc.) in response to the interrupt event. The duration (time from start to stop) of the refresh mode may be stored.

At step S203, the controller 10 determines whether or not the interrupt event is generated based on the user's operation on the input operation unit 12 (including remote control). Then, when the interrupt event is based on the user's operation, the controller 10 moves the process to step S204, and when the event is not based on the operation of the user, moves the process to step S205.

When the interrupt event is an event based on the operation of the user, the process is moved to step S204 in which the controller 10 executes a process according to the operation of the user as an interrupt process, and ends the flow. At this time, the controller 10 maintains on state without powering off the projector 1. When the operation is made through the input operation unit 12, since it can be assumed that the user is in the vicinity of the projector 1, even when the on state is maintained, it is highly unlikely that it will be left in that state for a long time. The user may turn off the power manually or may start the refresh mode again after performing necessary operations.

When the interrupt event is not based on the user's operation, the process is moved to step S205, in which the controller 10 determines whether or not the interrupt process corresponding to the generated interrupt event is the process including the off operation. Then, when the interrupt process is a process including the off operation, the controller 10 moves the process to step S206, and when the interrupt process is a process not including the off operation, moves the process to step S207. For example, when the generated interrupt event is an event informing the occurrence of an abnormality (for example, high-temperature abnormality) of the light source 21, the controller 10 performs a process of stopping power supply to the light source 21 and a process of informing the occurrence of abnormality by the indicator 13 and performs an off operation to turn off the power supply of the projector 1 for safety as an interrupt process in response to occurrence of this abnormality. That is, the interrupt process corresponding to the event informing the abnormality of the light source 21 is a process including the off operation.

When the process is moved to step S206, the controller 10 executes a process including the off operation as described above as the interrupt process, and ends the flow. In this way, the projector 1 is turned off by the interrupt process including the off operation after the end of step S206.

On the other hand, when the process is moved to step S207, the controller 10 executes the process not including the off operation as the interrupt process. Then, at the subsequent step S208, the controller 10 performs an off operation to power off the projector 1 and ends the flow. For example, when the interrupt event is generated by an emergency message received from the computer 2 informing the occurrence of a disaster such as an earthquake, the controller 10 performs a process of informing by the indicator 13 that the emergency message is received, and a process of superimposing and displaying the received emergency message on the image information processing unit 16 as an OSD image, as an interrupt process, at step S207. Then, after continuously displaying the emergency message for a predetermined time (for example, for several minutes), the controller 10 performs an off operation to power off the projector 1, at step S208. In other words, also in this case, the projector 1 is turned off after the end of the step S208.

As described above, when it is assumed that the user is not in the vicinity of the projector 1 in the refresh mode, since the projector 1 is shifted to the off state after the interrupt process is executed, it is possible to prevent the projector 1 from being left in an on state after the execution of the interrupt process.

As described above, according to the image projection system 100, the projector 1 and the control method thereof according to the present embodiment, the following effects can be obtained.

(1) According to the present embodiment, in the refresh mode for improving the burn-in of the liquid crystal panel, when an interrupt event is generated before the set refresh time elapses, the controller 10 stops the refresh mode and performs an off operation to power off the projector 1 after the corresponding interrupt process. For this reason, it is possible to prevent a situation that the projector 1 is left with the power turned on after the interrupt process.

(2) According to the present embodiment, when the generated interrupt event is an event corresponding to the operation of the user on the input operation unit 12, the controller 10 does not perform the off operation. That is, the power state after the interrupt process can be changed according to the type of interrupt process, thereby improving convenience of the user. Further, according to the present embodiment, the user can stop the refresh mode and use the projector 1 even in the refresh mode by operating the input operation unit 12.

(3) According to the present embodiment, when the refresh mode is stopped in response to the generation of an interrupt event, the controller 10 causes the storage unit 11 to store the information indicating the same, so that the fact that the refresh mode is not completed can be recorded as a history.

(4) According to the embodiment, since the controller 10 displays the refresh image on the image projection unit 17 while the light source 21 is in a light-on state, the liquid crystal panel can be maintained at a relatively high temperature, thereby effectively improving the burn-in.

According to the embodiments described above, the refresh mode corresponds to the first operation mode, the refresh image corresponds to the first image, and the set refresh time corresponds to the first time. In addition, an interrupt event not based on the operation of the user on the input operation unit 12 (for example, an event informing occurrence of abnormality of the light source 21) corresponds to the first interrupt and an interrupt event based on the operation of the user on the input operation unit 12 corresponds to the second interrupt.

Modification Example

Further, the above embodiments may be modified as follows.

In the above embodiment, an example of an interrupt event that can be generated during the refresh mode is illustrated as an operation of the user on the input operation unit 12, occurrence of an abnormality inside the projector 1, and reception of an emergency message from the computer 2 or the like, but the interrupt event is not limited to those mentioned above. For example, when the projector 1 has a function of automatically correcting the shape (distortion) of an image when a vibration of the projector 1 is detected by a sensor (not shown), the detection of vibration may be an interrupt event. Further, when the projector 1 has a function of turning off the light source 21 when an obstacle present in the projection direction is detected by a sensor (not shown), detection of the obstacle may be an interrupt event.

In the above embodiment, an all-black image is used as the refresh image, but the refresh image is not limited to the black image only. For example, it is possible to use an all-white image, or others as it may be determined as appropriate according to the characteristics of the liquid crystal panel and the like. In addition, the number of refresh images is not limited to one. For example, a plurality of refresh images of different colors may be prepared, and the refresh image may be switched in accordance with the lapse of time. In addition, the refresh image is not limited to a plain image of the same color in the whole region, and accordingly, may include a message or the like indicating that it is a refresh mode, for example. Meanwhile, in order to prevent the message itself from becoming a burn-in, it is preferable to change the display position of the message over time.

In the embodiment described above, it is preferable that the controller 10 informs the user at the next start-up that the refresh mode is stopped, based on the information stored in the storage unit 11 at step S202. For example, when the information indicating that the refresh mode is stopped is stored in the storage unit 11 at the time of activation (turn on operation), the controller 10 instructs the image information processing unit 16 to superimpose a message image indicating that the refresh mode is stopped as an OSD image and causes the image projection unit 17 to project the message image. In this way, the user is able to recognize that the refresh mode is stopped and that the refresh mode will be executed again if necessary. Here, the image information processing unit 16 and the image projection unit 17 at the time of superimposing and projecting the message image function as an informing unit for informing that the refresh mode is stopped. The means for informing that the refresh mode is stopped is not limited to informing with the message image only, and accordingly, it may be informed by the indicator 13 or may be informed with sound by a sound output means (not shown).

In the embodiment described above, when the interrupt event is generated based on the operation of the user on the input operation unit 12, the projector 1 is not powered off but maintained in the on state after executing the interrupt process. Meanwhile, the interrupt event that maintains the on state after the interrupt process is not limited to the event generated based on the operation on the input operation unit 12. For example, the on state may be maintained when an event is generated based on reception of a control signal for remotely operating the projector 1 from the computer 2 through the network NW.

In the embodiment described above, while the transmissive liquid crystal light bulbs 22R, 22G, and 22B are used as electro-optical devices, the reflective electro-optical devices such as reflective liquid crystal light bulbs can also be used. Further, an organic Electro Luminescence (EL) device that is self-luminous and does not require the light source 21 may be used as an electro-optical device. Further, the invention is not limited to a configuration that includes a plurality of electro-optical devices for each color light, and may be configured to modulate a plurality of color lights in a time division manner with one electro-optical device.

In the embodiment described above, the projector 1 is described as an example of the image display apparatus, but the image display apparatus is not limited to the projector 1 only. Accordingly, a liquid crystal display or an organic EL display, or other image display apparatus may be used as well.

What is claimed is:

1. An image display apparatus comprising:
    a display unit that has an electro-optical device and displays an image with the electro-optical device; and
    a controller configured to power off the image display apparatus after displaying a first image on the display unit for a first time in a refresh mode for improving a burn-in of the electro-optical device,
    wherein the controller is further configured to:
        determine whether an event to stop the refresh mode occurs during the refresh mode; and
        when it is determined that the event occurs:
            determine whether the event is based on an operation of the user,
                wherein when the event is determined to be based on the operation of the user, the controller is further configured to execute a process of interrupting the refresh mode and does not power off the image display apparatus, and
                wherein when the event is determined not to be based on the operation of the user, the controller is further configured to determine whether the event includes an off operation, and when the event includes an off operation, the controller is configured to execute the interrupt process with the off operation, and when the event does not include the off operation, the controller is configured to execute the interrupt process without the off operation including displaying a message for a predetermined time, and to subsequently power off the image display apparatus.

2. The image display apparatus according to claim 1, wherein the controller is configured to the refresh mode in a case where a second interrupt different from a first interrupt is generated in the refresh mode, but does not power off the image display apparatus after executing a process according to the second interrupt.

3. The image display apparatus according to claim 2, further comprising:
    a plurality of operation keys that receives an operation of a user,
    wherein the second interrupt is an interrupt based on the operation on the plurality of operation keys.

4. The image display apparatus according to claim 1, further comprising:
    a storage unit,
    wherein in a case where the refresh mode is stopped, the controller causes the storage unit to store information indicating that the refresh mode is stopped, and in a case where the information indicating that the refresh mode is stopped is stored in the storage unit when the image display apparatus is powered on, the controller informs that the refresh mode is stopped.

5. The image display apparatus according to claim 1, wherein the display unit modulates a light emitted from a light source with the electro-optical device to display the image, and
    the controller causes the display unit to display the first image while maintaining the light source in a light-on state in the refresh mode.

6. A control method of an image display apparatus including a processor for displaying an image with an electro-optical device, the method comprising:
    performing, using the processor, a power off processes that powers off the image display apparatus after completing displaying a first image for a first time in a refresh mode for improving a burn-in of the electro-optical device;
    determining, using the processor, whether an event to stop the refresh mode occurs during the refresh mode;
    when it is determined that the event occurs, determine, using the processor, whether the event is based on an operation of the user;
    when the event is determined to be based on the operation of the user, execute, using the processor, a process of interrupting the refresh mode and not powering off the image display apparatus;
    wherein when the event is determined not to be based on the operation of the user, determine, using the processor, whether the event includes an off operation, and when the event includes an off operation, execute the interrupt process with the off operation, and when the event does not include the off operation, execute the interrupt process without the off operation including displaying a message for a predetermined time, and subsequently power off the image display apparatus.

* * * * *